Aug. 7, 1962     C. A. SHOPE     3,048,112
GAS GENERATOR

Filed Feb. 6, 1959     2 Sheets-Sheet 1

INVENTOR.
C. A. SHOPE

BY Hudson & Young

ATTORNEYS

Aug. 7, 1962 C. A. SHOPE 3,048,112
GAS GENERATOR
Filed Feb. 6, 1959 2 Sheets-Sheet 2

INVENTOR.
C. A. SHOPE
BY Hudson & Young
ATTORNEYS though the invention should not be construed as being necessarily limited thereto, since this invention will find utility wherever a need arises for the production of high thrust or specific impulse in a relatively short time, i.e., a matter of seconds or fractions of a second.

Accordingly, an object of this invention is to provide an improved gas generator loaded with solid propellant. Another object is to provide a jet propulsion device or gas generator loaded with solid propellant, which device is particularly adapted for ejection of a crewman with seat and auxiliary equipment from a disabled aircraft. Another object is to provide a charge of solid propellant having a novel geometry or configuration especially adapted to withstand great forces of acceleration and also capable of ready ignition. Another object is to provide a solid propellant charge having a reduced tendency to break up, especially during ignition and near burnout, said charge also having a relatively high loading density. Another object is to provide a gas generator or rocket motor loaded with solid propellant capable of producing high thrust or specific impulse in a relatively short time. Another object is to provide a rocket motor or gas generator particularly adapted for aircraft seat ejection service, said motor being characterized by a high propellant loading density, minimum weight, and ease of assembly and disassembly for purposes of inspection. Other objects and advantages of this invention will become apparent from the following discussion, appended claims, and accompanying drawing in which:

Figure 1:
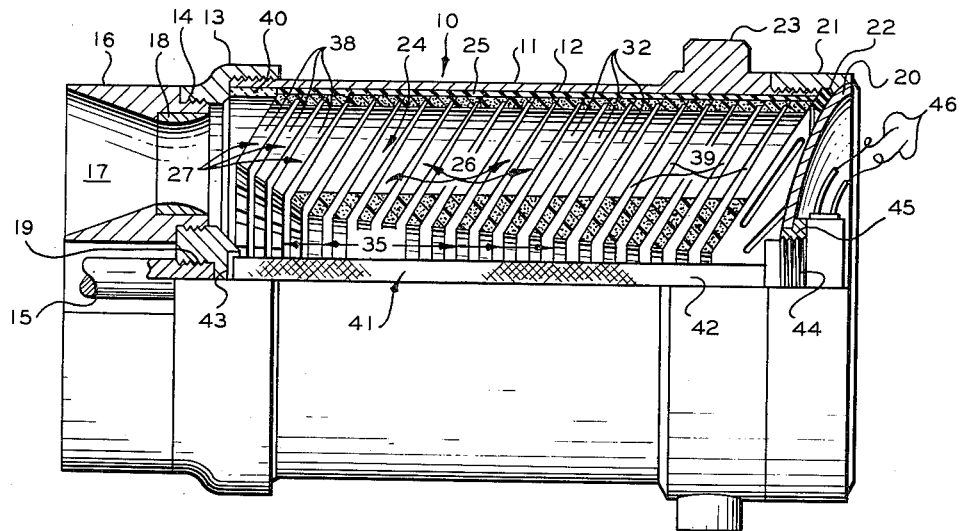
FIGURE 1 is a side elevational view in longitudinal quarter section of one embodiment of the novel gas generator of the instant invention.
Figure 2:
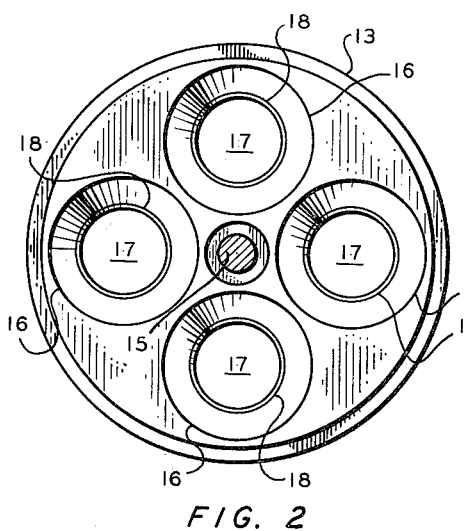
FIGURE 2 is an aft end view of FIGURE 1.

Referring now to the drawing, in which like reference numbers have been used to designate like parts, and initially to FIGURES 1 and 2, there is illustrated a gas generator generally designated 10. The gas generator can be mounted to the aircraft seat in any desirable fashion, such as by mounting it across the back of the seat so that the thrust magnitude of the gas generator acts parallel to the rails or tracks on which the seat moves during ejection. Gas generator 10 comprises a tubular or cylindrical casing 11, made of metal such as aluminum alloy or the like, which defines a cylindrical combustion chamber 12. The aft end of casing 11 is threaded and aft closure member 13 is threadedly secured thereto. Aft closure member 13 is provided with a plurality of circumferentially arranged threaded openings 14 in which are threadedly secured a plurality of reaction nozzles 16 of the De Laval type having axial converging-diverging passages 17 which communicate at their inlet ends with combustion chamber 12. The smallest cross-sectional area of each passage 17, that is, its throat, can be defined by a beveled or constricted annular carbon insert 18. Aft closure member 13 can also be provided with a central threaded opening 19 in which can be threadedly secured any suitable hold-down assembly 15, adapted to normally secure the gas generator to the air frame of an aircraft. The head end of casing 11 is closed by means of a concave head closure member 20 which projects inwardly into the combustion chamber 12, the outer periphery of the closure member being welded or otherwise secured to an annular flange 21 or the like which is threadedly secured to the head end of the casing 11. A suitable annular sealing ring 22, such as an O-ring, or the like, is interposed between the peripheral portion of the head closure member 20 and the head end of the casing 11. The outer portion of casing 11, near the head end thereof, can be provided with an integral trunnion 23, or the like, for purposes of securing the gas generator to the ejection seat.

Loaded within combustion chamber 12 is the novel solid propellant charge 24 of this invention, said charge comprising a plurality of axially aligned, nested, hollow, frusto conical annular grains 26, 27 of solid propellant, the peripheral portions of the grains being covered with suitable restricting material 25, such as rubber, which is adhesively bonded on one side to the peripheral portions of the grains and on the other side to the inner wall of casing 11.

Figure 3:
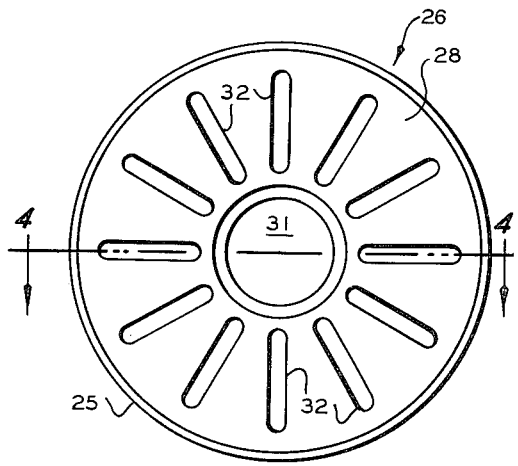
FIGURES 3 and 5 are two plan views of two types of grains shown in FIGURE 1.
Figure 4:
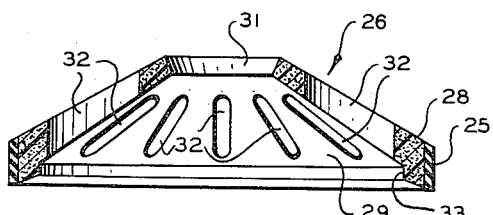
FIGURES 4 and 6 are cross-sectional views of FIGURES 3 and 5, respectively, taken along the planes indicated.

Propellant grains or disc 26 is shown clearly in FIGURES 3 and 4. Each annular propellant grain 26 has a hollow, frusto conical configuration having outer and inner, non-parallel conical surfaces 28, 29, respectively, which define a tapered web of propellant. These conical surfaces 28, 29 are exposed or unrestricted and serve as the main burning surfaces of the grain. The small diameter end or apex of grain 26 is provided with an axial, circular opening 31 which is preferably beveled or tapered inwardly as shown in the drawing. Propellant grains 26 are provided with a plurality of circumferentially elongated perforations or slots 32 which are also defined by exposed or unrestricted burning surfaces. As mentioned hereinbefore, the outer peripheral portion of the propellant grain 26 is adhesively bonded to restrictor material 25, such as rubber or other slow burning or non-combustible material. The outer extremity of the inner surface 29 is flanged or so shaped as to define an annular land 33.

Figure 5:
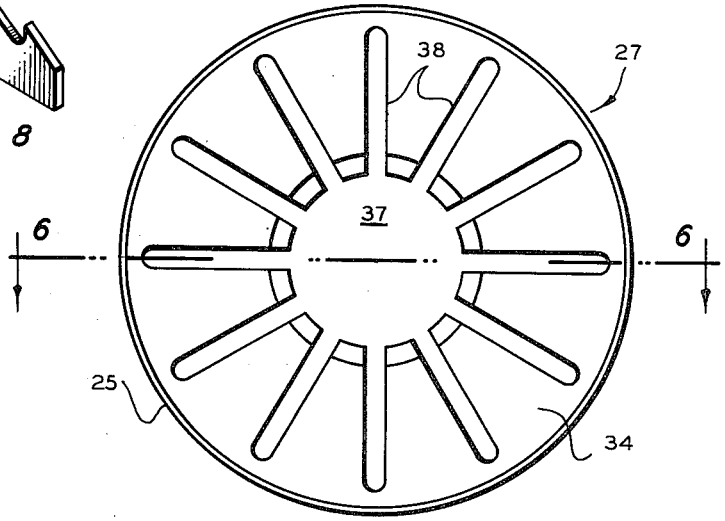
Figure 6:
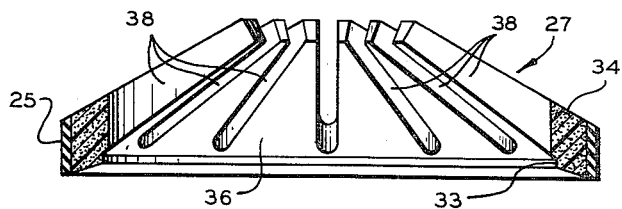

The propellant grain or disc 27, of which three are shown in FIGURE 1 adjacent the aft end of the combustion chamber 12, is clearly shown in FIGURES 5 and 6 and is similar in most respects to propellant grain 26 of FIGURES 3 and 4. Propellant grain 27 has hollow frusto conical configuration and outer and inner, non-parallel, exposed conical surfaces 34, 36, respectively. The small diameter end of propellant grain 27 is also provided with an axial, circular opening 37 which is larger than the corresponding opening 31 of FIGURES 3 and 4. Propellant grain 27 is similarly provided with a plurality of circumferentially spaced, radially elongated perforations 38 which are defined by exposed burning surfaces. However, unlike perforations 32 of FIGURES 3 and 4, the inner extremities of perforations 38 communicate with the axial opening 37.

The grains 26, 27 can be easily fabricated by die extrusion and are dimensionally stable and structurally strong. By varying the angle of taper of the conical surfaces, the shape of the axial opening, and the number and shape of the radial perforations or slots, the available burning surface can be varied to meet any design or ballistic requirements. The grains 26, 27 illustrated in the drawing will burn on all surfaces except the restricted outer peripheries.

Referring again to FIGURE 1, a plurality of propellant grains 26, 27 are axially aligned and stacked or mounted in a closely spaced, nested fashion to form the generally cylindrical propellant charge 24, the small diameter ends or apices of the grains being closer to the aft end of the generator than the large diameter ends or outer peripheries of the grains. The peripheral portions of grains 26, 27 are contiguous by reason of annular lands 33, while the other portions of adjacent grains are separated by outwardly tapered, narrow spaces 39. As shown in FIGURE 1, the axial openings of propellant grains 26, 27 form in part an axial channel or perforation 35 which is tapered toward the head end of the combustion chamber, or, stated another way, the cross-sectional area of the axial perforation or channel 35 progressively increases toward the aft end of the combustion chamber, this cross-sectional area increasing markedly near the aft end of the combustion chamber 12. The last propellant grain 27 adjacent the aft end of the combustion chamber 12 abuts a suitable annular support member 40, made from suitable refractory or semi-refractory material, or the like.

Axially disposed within the axial channel 35 in close proximity to all the grains 26, 27 is a suitable tubular igniter generally designated 41, containing black powder or other conventional pyrotechnic material packed within a suitable frangible tubular or cylindrical member 42, made, for example, of small wire mesh the openings of which are closed with easily rupturable or frangible plastic or rubbery material which will fail when subjected to heat and pressure. Igniter 41 can be axially mounted within the combustion chamber in any suitable manner, such as by seating the aft end of the tubular member 42 in a circular depression 43 provided axially in the inner face of the aft closure member 13. The head end of the tubular member 42 is affixed to a suitable externally threaded head 44 which can be threadedly secured to an annular igniter mount 45 which is in turn welded or otherwise secured to the head closure member 20. Igniter head 44 can be provided with suitable electrical binding posts or other suitable electric leads that are connected to electro-responsive members, such as squibs, matches, or the like embedded within the ignition material in tubular member 42, and these binding posts or leads connected by suitable electrical wires 46 to an external power source, such as a battery.

Figure 7:
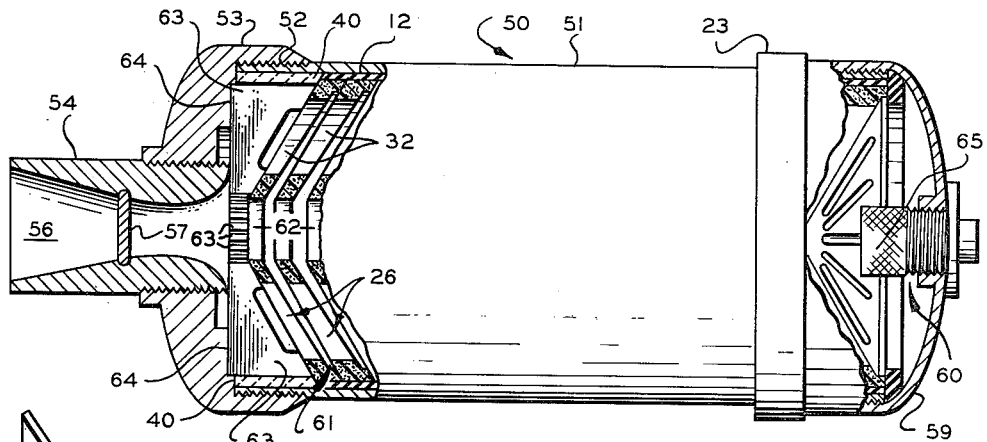
FIGURE 7 is a side elevational view in partial longitudinal cross section of another embodiment of the gas generator of this invention.
Figure 8:
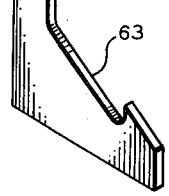
FIGURE 8 is an isometric view of one of the grain support plates shown in FIGURE 7.

Referring now to FIGURE 7, another embodiment of the gas generator of this invention is illustrated and generally designated 50. Gas generator 50 comprises a cylindrical casing 51, the aft end of which is threadedly secured at 52 to an annular aft closure member 53 which is threadedly secured to a reaction nozzle 54 of the De Laval type having an axial converging-diverging passage 56 which communicates at its inner end with combustion chamber 12. If desired, a suitable starter disc or blowout disc 57 can be peripherally mounted anywhere along nozzle passage 56, this starter disc adapted to rupture or otherwise fail when a predetermined working pressure (e.g., 200 p.s.i.) is established within combustion chamber 12. Although in FIGURE 7 the longitudinal axis of nozzle 54 coincides with that of the combustion chamber 12, alternatively the nozzle can be canted so that its axis is at an angle, e.g., 90 degrees, with respect to the chamber axis. The head end of casing 51 is closed by a convex closure member 59 having an axial opening in which is threadedly secured igniter 60, the inner portion of which is in the form of a frangible container 65, such as plastic or rubber coated wire mesh, containing black powder or other suitable pyrotechnic material which is ignited by similar electro-responsive means embedded within the pyrotechnic material upon the closing of a suitable switch in an external power source. Combustion chamber 12 of rocket motor 50 is similarly loaded with a solid propellant charge 61 similar to charge 24 hereinbefore described in regard to FIGURE 1. However, charge 61 comprises a plurality of nested grains 26 each of which preferably has the same size axial opening 31 that together form axial passage 62 having a constant cross-sectional area. In addition to refractory ring 40, the aft end of charge 61 can be supported by a plurality of circumferentially arranged triangular-like support plates 63 or the like, made of thin metal or the like, which are held in recesses 64 at their base and abut at their inner ends the outer conical surfaces of the last grain 26 between its perforations 32.

It should be apparent from the foregoing discussion that the instant invention is not necessarily limited to any particular hardware. That is, the gas generator of this invention can be provided with one or more reaction nozzles, and any suitable igniter (electrical or mechanical) which can be positioned in the head end of the rocket motor or extend axially into the combustion chamber within the axial channel defined by the propellant grains. However, the embodiment illustrated in FIGURE 1 is generally preferred, this embodiment being particularly applicable as a gas generator for ejecting a crewman with seat and auxiliary equipment from a disabled aircraft.

In the operation of the gas generator 10 illustrated in FIGURE 1, upon closing a suitable switch in an external power source, electric current flows to the electro-responsive means in contact with the ignition material within igniter tube 42, causing the ignition of the igniter material and the resulting generation of hot ignition products which melt or otherwise rupture the frangible igniter tube 42 and escape therefrom. The hot ignition products propagate immediately throughout the combustion chamber, the heat from these products being transferred to the exposed burning surfaces of the solid propellant charge 24, such as the inner and outer surfaces of propellant grains 26, 27 and the surfaces defining the radial perforations 32, 38, raising the temperature of these exposed burning surfaces to an ignition temperature. Thereafter, the propellant material burns and generates hot combustion gases which flow down spaces 39, axial channel 35, and through the perforations 32, 38, of the various propellant grains, these gases escaping from the combustion chamber 12 through the nozzle passages 17, thereby imparting thrust to the gas generator 10. Where these gas generators are employed for seat ejection service, the thrust produced by the gas generator is imparted to the seat and it is caused to move at a rapid acceleration along suitable tracks, rails, or the like, causing the ejection of the seat and crewman from the aircraft. The gas generator 50 illustrated in FIGURE 7 is operated in a similar fashion, the combustion gases resulting from the burning or consumption of propellant charge 61 raising the temperature and pressure within the combustion chamber to a predetermined working pressure which first causes the failure or rupture of starter disc 57, these gases then escaping through the now opened nozzle passage 56 and imparting thrust to the gas generator 50, in the manner described hereinbefore.

Any suitable solid propellant material known in the art can be employed to fabricate the propellant grains used in forming the novel solid propellant charge of this invention. However, it is preferred that the propellant material employed be that of the composite type comprising a major amount of a solid inorganic oxidizing salt and a minor amount of a combustible, organic binder, such as natural or synthetic rubber. It is especially preferred that these composite propellants have relatively high specific impulses, e.g., 220–230 seconds.

The inorganic oxidizing salt which can be used is preferably selected from the group consisting of the ammonium, alkali metal, and alkaline earth metal salts of nitric, perchloric, and chloric acids, and mixtures thereof. Ammonium nitrate and ammonium perchlorate are the preferred oxidizers for use in the solid propellant charges of this invention. Other representative oxidizers include sodium nitrate, potassium perchlorate, lithium chlorate, calcium nitrate, barium perchlorate, and strontium chlorate. Mixtures of these oxidizers are also applicable. In the preparation of the solid rocket fuel compositions, the oxidizers are powdered to sized preferably from 10 to 300 microns average particle size. The amount of solid oxidizer employed is a major amount of the total composition and is generally in the range between 50 and 95 percent by weight of the total propellant mixture.

The binder material employed in these composite propellants is preferably natural or synthetic rubber. It serves as the major fuel and also as the matrix for holding together the solid inorganic oxidizing salt and other powdered propellant materials which form a discontinuous phase.

Particularly suitable compression molded or extrudable solid propellant compositions which may be employed are those disclosed and claimed in copending applications Serial No. 284,447, filed April 25, 1952, and Serial No. 561,943 filed January 27, 1956, both by W. B. Reynolds et al. The propellant compositions disclosed in these copending applications comprise a solid inorganic oxidizer, and a binder formed by polymerizing a vinyl-substituted heterocyclic nitrogen base compound with an open chain conjugated diene. The following empirical formulas or recipes generally represent the class of extruded solid propellant compositions preferred for the preparation of the propellant charge of this invention.

TABLE I

| Ingredient | Parts per 100 Parts of Rubber | Parts by Weight |
|---|---|---|
| Binder | | 5–50 |
|   Copolymer (Bd/MVP) | 100 | |
|   Philblack A (a furnace black) | 10–30 | |
|   Plasticizer | 10–30 | |
|   Silica | 0–20 | |
|   Metal Oxide | 0–5 | |
|   Antioxidant | 0–5 | |
|   Wetting Agent | 0–2 | |
|   Accelerator | 0–2 | |
|   Sulfur | 0–2 | |
| Oxidizer (Ammonium Nitrate) | | 50–95 |
| Burning Rate Catalyst | | 2–30 |

The polymerizable heterocyclic nitrogen bases which are applicable for the production of polymeric binder materials are those having a vinyl group

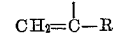

where R is either hydrogen or a methyl group, and are copolymerizable with a conjugated diene. Substituted heterocyclic nitrogen base compounds particularly useful are those selected from the group consisting of pyridine, quinoline, alkyl substituted pyridine and an alkyl substituted quinoline, where the total number of carbon atoms in the nuclear alkyl substituents is not more than 15. Of these, the compounds of the pyridine series are of the greatest commercial interest at present. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25.

These heterocyclic nitrogen bases can be represented by the following structural formulas:

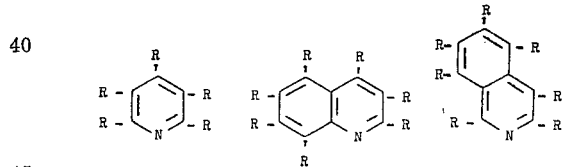

where R is selected from the group consisting of hydrogen, alkyl, vinyl, alpha-methylvinyl, alkoxy, halo, hydroxy, cyano, aryloxy, aryl, and combinations of these groups such as haloalkyl alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4-5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; -2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The conjugated dienes employed in preparing the rubbery copolymer materials which are utilized as binders are preferably those containing from 4 to 8 carbon atoms per molecule. Representative conjugated dienes which can be employed include 1,3-butadiene, isoprene, 2-methyl-1,3-butadiene, 2,3-dimethyl-1,3-butadiene, piperylene, methylpentadiene, chloroprene, and the like. Various alkoxy derivatives, such as methoxy and ethoxy, and cyano derivatives of these conjugated dienes are also applicable, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, and the like. Instead of using a single conjugated diene, a mixture of conjugated dienes can also be employed, such as a mixture of 1,3-butadiene and isoprene.

Suitable plasticizers useful in preparing these propellant grains include TP–90–B (dibutoxyethoxyethyl formula supplied by Thiokol Corporation); benzophenone; and Pentaryl A (monoamylbiphenyl). Suitable silica preparations include a 10–20 micron size range supplied by Davison Chemical Company; and Hi-Sil 202, a rubber grade material supplied by Columbia-Southern Chemical Corporation. A suitable antioxidant is Flexamine, a physical mixture containing 25 percent of a complex diarylamine-ketone reaction product and 35 percent of N,N'diphenyl-p-phenylenediamine, supplied by Naugatuck Chemical Corporation. A suitable wetting agent is Aerosol-OT (dioctyl sodium sulfosuccinate, supplied by American Cynamid Company). Satisfactory rubber cure accelerators include Philcure 113(N,N-dimethyl-S-tertiary butylsulfenyl dithiocarbamate); butyl-8 (a dithiocarbamate-type rubber accelerator supplied by R. T. Vanderbilt Company); and GMF (quinone dioxane, supplied by Naugatuck Chemical Company).

Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, Laundry blue, washing blue, Williamson blue, and the like.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

High energy additives such as finely divided aluminum, magnesium, boron and other finely divided metals can also be used in the propellant compositions of the invention. Said finely divided metals will usually have a particle size within the range of 1 to 50 microns and will usually be used in amounts within the range of 0 to 20 weight percent based on the total propellant composition.

Various modifications and alterations of this invention will be apparent to those skilled in the art without departing from the scope and spirit of this invention, and it should be understood that the foregoing discussion and accompanying drawings illustrate preferred embodiments of this invention and the latter is not to be unduly limited thereto.

I claim:

1. A grain of solid propellant, said grain having a hollow, frusto conical, annular configuration, said grain having a circular opening in the apex thereof and two exposed conical surfaces with a plurality of radial slots therein.

2. The grain according to claim 1 wherein the inner extremities of said radial slots extend to said circular opening.

3. The grain according to claim 1 wherein said exposed conical surfaces consist of an inner surface and an outer surface which together define a web of propellant which progressively increases in thickness toward the outer periphery of said grain, the outer extremity of said inner surface defining an annular land, said periphery of said grain being covered with restricting material.

4. The grain according to claim 1 wherein said solid propellant is of the composite type comprising a major amount of a solid inorganic oxidizing agent and a minor amount of a rubbery binder.

5. A cylindrical charge of solid propellant, said charge having an axial perforation, said charge comprising a plurailty of axially aligned, nested, hollow, frusto conical annular grains of propellant having exposed conical surfaces and axial openings which together form said axial perforation, each of said grains having a plurality of radial slots therein.

6. A cylindrical charge of solid propellant, said charge having an axial perforation, said charge comprising a plurality of axially aligned, nested, hollow, frusto conical annular grains of propellant, each of said grains having exposed conical surfaces with a plurality of radial slots formed therein, and an axial opening in the apex of each grain, the several axial openings of said grains forming said axial perforation, the exposed conical surfaces of adjacent grains being spaced, said grains being contiguous at the peripheries of their exposed conical surfaces, the outer peripheries of said grains being restricted.

7. The charge of solid propellant according to claim 6, wherein said solid propellant is of the composite type comprising a major amount of a solid inorganic oxidizing agent and a minor amount of a rubbery binder.

8. A cylindrical charge of solid propellant according to claim 6 wherein the cross-sectional area of said axial perforation progressively increases toward the aft end of said charge.

9. A cylindrical charge of solid propellant according to claim 8 wherein a plurality of said grains adjacent the aft end of said charge have radial slots which extend to said axial perforation.

10. A cylindrical charge of solid propellent according to claim 6 wherein the cross-sectional area of said axial perforation is constant.

11. A cylindrical charge of solid propellent according to claim 6 wherein the exposed conical surfaces of each of said grains consist of an inner surface and an outer surface which together define a web of propellent which progressively increases in thickness toward the outer periphery of said grain, the outer extremity of said inner surface defining an annular land, said periphery of said grain being covered with restricting material.

References Cited in the file of this patent

UNITED STATES PATENTS

| | | |
|---|---|---|
| 2,464,181 | Lauritsen | Mar. 8, 1949 |
| 2,481,059 | Africano | Sept. 6, 1949 |
| 2,628,561 | Sage et al. | Feb. 17, 1953 |
| 2,661,692 | Vegren | Dec. 8, 1953 |
| 2,750,887 | Marcus | June 19, 1956 |
| 2,791,883 | Moore et al. | May 14, 1957 |
| 2,801,587 | Gould | Aug. 6, 1957 |
| 2,816,418 | Loedding | Dec. 17, 1957 |
| 2,862,447 | Lyon | Dec. 2, 1958 |
| 2,877,504 | Fox | Mar. 17, 1959 |
| 2,990,682 | Mullaney | July 4, 1961 |

OTHER REFERENCES

A Quasi-Morphological Approach to the Geometry of Charges for Solid Propellant Rockets, The Family Tree of Charge Designs, Jet Propulsion, Feb. 1956, pages 102–105, vol. 26, No. 2.